United States Patent [19]

Albrecht et al.

[11] 4,406,493
[45] Sep. 27, 1983

[54] PANEL LATCHING AND LOCKING APPARATUS FOR MODULAR PICKUP TRUCK BED COVER SYSTEMS

[75] Inventors: Leonard N. Albrecht; Bert C. Taylor, Jr., both of Westminster, Calif.

[73] Assignee: TRAXystems, Westminster, Calif.

[21] Appl. No.: 303,906

[22] Filed: Sep. 21, 1981

[51] Int. Cl.[3] ............................................. B60J 7/02
[52] U.S. Cl. ..................................... 296/100; 160/32
[58] Field of Search ...................... 296/100, 216, 222; 160/32, 36

[56] References Cited

U.S. PATENT DOCUMENTS

| | | | |
|---|---|---|---|
| 3,342,523 | 9/1967 | Lutgen | 296/100 |
| 3,640,565 | 2/1972 | Anderson | 296/100 |
| 3,649,072 | 3/1972 | Cross | 296/100 |
| 3,762,763 | 10/1973 | Deshores | 296/100 |

Primary Examiner—Robert R. Song
Attorney, Agent, or Firm—Fowler, Lambert & Hackler

[57] ABSTRACT

For a modular pickup bed cover system having a plurality of rigid transverse panels which slidingly fit into longitudinal channels fixed along bed side walls, interpanel latching is provided by a transverse, channel-shaped first latching member fixed across rearward ends of all except the rearmost panel and a matching, transverse, angle-shaped second latching member fixed across forward ends of all except the forwardmost panel. Fixed across the rear panel of each panel pair in panel abutment regions is an elastomeric seal. As each pair of panels is latched together, upon installation thereof into the truck bed side channels by pivotally fitting the rearward panel angle member into the forward panel channel member, the seals are compressed a preselected amount assuring weathertight interpanel sealing. Shaped end regions of the latching members cause transverse panel alignment during latching. Locking elements at rearward ends of the longitudinal channels cooperate with slightly bowed side edge regions of the panels to provide disengageable panel channel locking. Such locking also enables determination of safe interpanel unlatching on panel removal from the truck bed.

9 Claims, 5 Drawing Figures

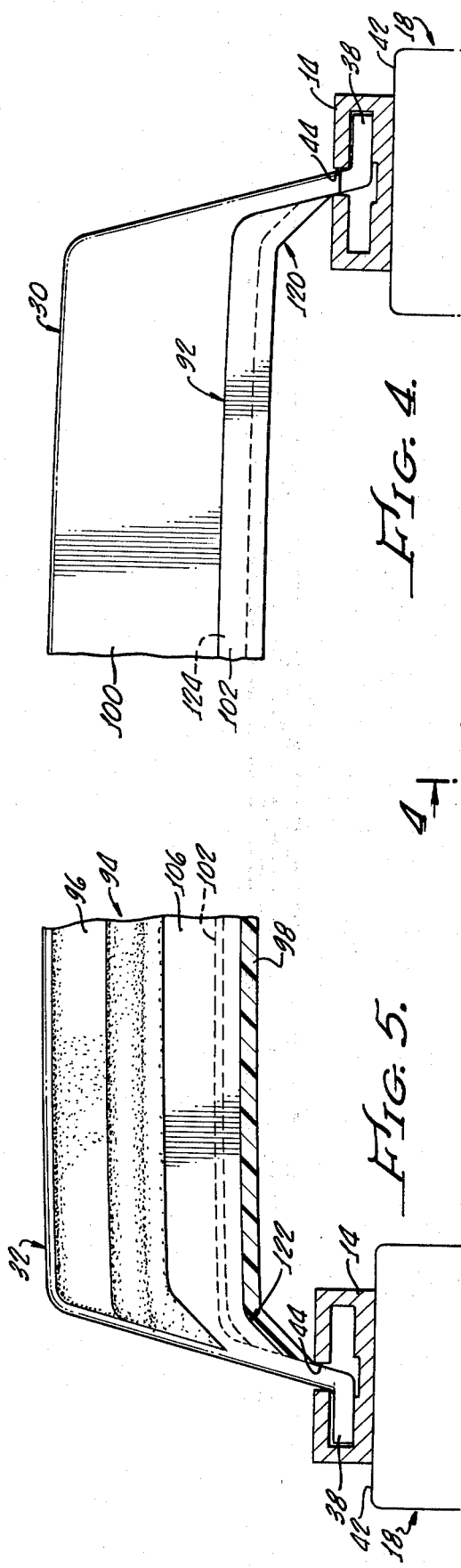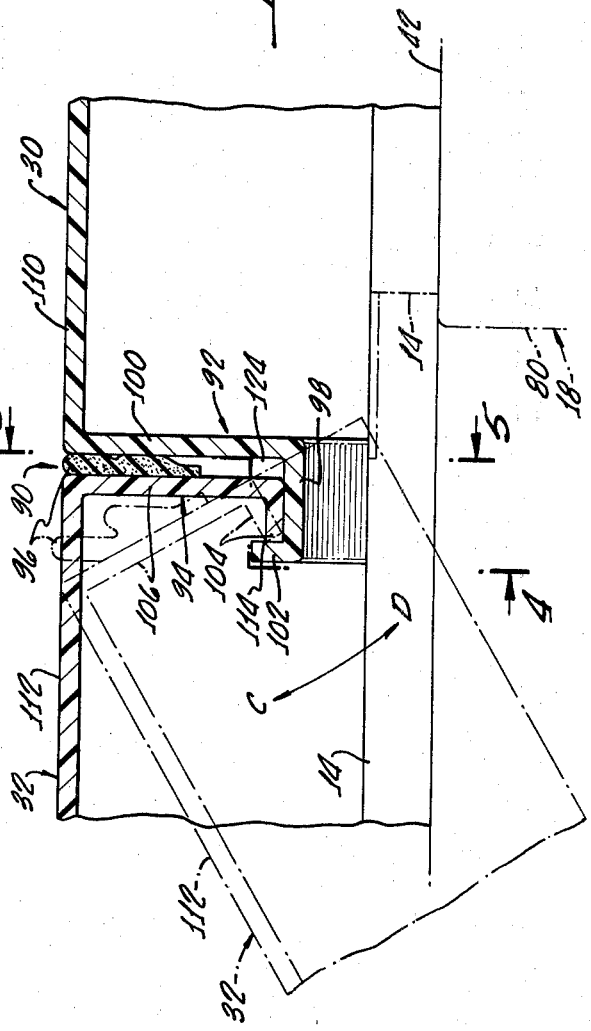

PANEL LATCHING AND LOCKING APPARATUS FOR MODULAR PICKUP TRUCK BED COVER SYSTEMS

BACKGROUND OF THE INVENTION

1. Field of the Invention

The present invention relates generally to the field of detachable covers for beds of pickup trucks and the like, and more particularly to the field of segmented covers for such truck beds.

2. Discussion of the Prior Art

There is disclosed, for example, in applicants' prior U.S. Pat. No. 4,199,188, which issued on Apr. 22, 1980 and is titled "VEHICLE ACCESSORY SYSTEM", a modular or segmented, easily installable and removable cover for beds of pickup trucks and the like. The cover panels or segments were disclosed to be constructed to form a rigid, relatively flat cover or an inverted U-shape "camper shell"; alternative shapes, including tool box shapes, were also disclosed. Rapid and easy panel segment installation and removal is enabled by flanged side legs of the panels which are configured to longitudinally slide along a pair of "C"-shaped channels mounted along uppermost surfaces of the truck bed side walls, one channel per truck bed side.

Ordinarily, a sufficient number of panels, for example, three or four, are slidably installed, one at a time, in the side channels so as to completely cover the truck bed. Transverse, flexible seals, fixed to panels at each panel-to-panel interface, are compressed to provide sealing against water, dirt, etc. when the truck tailgate is closed and the panels are longitudinally squeezed together. Closing the tail gate may also function to lock all the panels in the side channels; or, a separate, rear panel lock may be provided.

As discussed in the referenced patent, the disclosed, segmented truck bed cover has many important advantages over previously available single piece truck bed covers. For example, the segmented cover structure enables rapid, easy, one-person cover installation onto, and removal from, a pick up truck bed. In contrast, previously available, rigid, single piece truck bed covers are ordinarily very difficult, and often impossible, for one person alone to install and remove. Furthermore, an uninstalled set of the segmented cover panels can be conveniently stored in a relatively small space, as compared to space required for a corresponding single piece cover.

In spite of these and other benefits and advantages of the modular covers disclosed in applicants' U.S. Pat. No. 4,199,188, some deficiencies, to which this present invention is addressed, have been encountered.

For example, it has sometimes been found that good water and dirt sealing between all the flat-type panels of an installed modular truck bed cover set is difficult to achieve without using considerable time and effort. These sealing problems tend to occur when panel legs and/or the panel mounting channels are bent, nicked or otherwise deformed, or if the channels are blocked with dirt, snow or ice. The resulting panel jamming causes uneven seal compression forces to be applied to the various interpanel seals when the tailgate is closed. In this regard, it is to be appreciated that the interpanel latches disclosed in applicants' above identified patent for use with camper shell cover segments, and which assist in obtaining interpanel sealing, are not well adaptable to flat cover panels because of lack of access from within the covered truck bed needed to operate the latches.

Another problem also related to lack of positive, flat panel interconnection is that difficulties may sometimes be experienced with removal of the panels by only one person. Because the installed panels are ordinarily withdrawn from rearward ends of the side channels, each panel must be individually slid to the rear of the bed for removal. If, for reasons mentioned above, the panels do not freely slide in the channels, they are difficult to move rearwardly by one person outside the truck and the individual may inconveniently have to get into the truck bed to push the panels rearwardly. This is particularly difficult to do if the truck bed contains equipment, tools or other materials.

Furthermore, problems relating to securely retaining the cover panels in the mounting channels may sometimes occur. As an example, when panel retention is provided by the closed tailgate, if the tailgate of a moving truck accidentally opens, the panels may vibrate off, be lost, damaged and/or create a safety hazard to following vehicles. Also, with tailgate panel locking, the tailgate cannot be left open, as may be necessary to carry long loads such as long pipes or lumber. Even when the rearmost panel of a set has integral locking provisions, similar problems exist if this panel is removed to provide partial bed covering, for example, to permit carrying of articles or equipment which are too tall to fit under the cover panels.

For these and other reasons, applicants have invented improvements to the pickup bed covering apparatus disclosed in their above identified patent. These improvements include means for insuring a minimum seal compression between each adjacent pair of installed cover panels, to thereby improve weather and dirt sealing between the panels, as is important for protecting articles or material carried in the truck bed. At the same time, quick releaseable interlocking between each adjacent pair of installed panels is provided. This enables, during panel removal, all of the panels to be pulled rearwardly in unison, by pulling on the rearmost panel. This is particularly desirable in that it also enables easy access to forward regions of the truck bed, as is frequently necessary after quick vehicle stops have caused material carried in the bed to slide to the forward end of the bed.

In addition, applicants' improvements include disengageable panel locks to prevent accidental rearward sliding of installed cover panels out of rearward ends of the side channels. These locks also cooperate with interconnections between the panels to indicate when the interconnection can be released without panel damage.

SUMMARY OF THE INVENTION

The present invention particularly relates to a truck bed modular cover system having a plurality of transverse panels of a width spanning the bed and including a pair of longitudinal panel edge receiving members mounted along opposite sides of the bed, and in which the panels include compressable transverse panel seals between each adjacent pair of panels when the panels are received by the panel mounting members in a predetermined arrangement to cover the bed.

To solve the above mentioned and other problems associated with such cover systems, applicants' panel interconnecting and locking apparatus comprises latching means for releasable latching together each adjacent pair of panels as the panels are being installed in the mounting members and for assuring a predetermined minimum compression of the panel seals therebetween. The latching means including a rigid first latch member fixed to a transverse end of a first one of each of the adjacent pair of received panels and a rigid second latch member fixed to an adjacent transverse end of a second one of each of the adjacent pair of received panels, the first and second latch members being engageable and disengageable, as the panels are received by, and removed from, the mounting members by pivoting a rearward panel of each of the adjacent pairs of panels relative to a forward panel thereof, the predetermined minimum seal compression being caused when the rearward panel is pivoted into a longitudinally aligned relationship with the forward panel.

Included in the apparatus are locking means for releasably locking each panel relative to at least one of the longitudinal panel edge receiving members as each panel is fully received thereby, and for preventing removal therefrom until each panel is unlocked. Preferably the locking means includes a locking element, which cooperatively acts with slightly bowed panel edge flanges, and which is fixed near a rearward end of at least one of the longitudinal members in a position enabling an unlocked, rearward one of each adjacent pair of installed panels to be removed from the longitudinal members to be pivotally unlatched from the corresponding forward panel while the forward panel remains locked relative to the longitudinal members. As a consequence, the locking means thereby also enables a determination to be made of when any just removed rearward panel may be pivoted relatively to the forwardly adjacent panel for unlatching and separation therefrom without panel damage.

Also preferably, the panel latching means includes means causing transverse alignment of adjacent panels during latching therebetween, receiving of the rearward panel of each adjacent pair of panels into the longitudinal members being thereby readily enabled.

More specifically, assuming the panel system includes a forward panel, at least one intermediate panel and a rearward panel, the first latch members are preferably formed in channel shape and are fixed to rearward end surfaces of the forward and intermediate panels and the second latch members formed are in angle shape and are fixed to forward end surfaces of the intermediate and rearward panels, the angle shaped member fitting downwardly into the channel shaped member for panel latching. Each first latch member includes a rearwardly extending portion having an upwardly extending leg formed at a rearward end thereof, and each second latch member includes a first downwardly extending portion having a rearwardly extending leg formed at a lower end thereof. A rearward end of the second member rearwardly extending leg fits downwardly into and pivots about a region of the first member defined by the intersection of the horizontal portion and vertical leg thereof upon latching engagement between forward and rearward panels of each adjacent pair of received panels.

Because all the panels of the cover assembly are latched together upon installation, the entire assembly can be easily pulled rearwardly, after unlocking the rearmost panel, to enable ready access to forward regions of the truck bed and to enable easy one-panel-at-a-time removal from the rear of the truck bed. The seal compression caused by panel interlatching assures weather-tight interpanel sealing to protect contents in the truck bed. However, in case of seal damage or seal obstruction, as by presence of foreign material in the seal area, the channel shaped member, which extends between opposite side edges of the panels, functions as a rain gutter to channel any water which bypasses the seal to the panel mounting members at sides of the truck bed, and hence away from the truck bed.

BRIEF DESCRIPTION OF THE DRAWINGS

A better understanding of the present invention may be had from a consideration of the following detailed description, taken in conjunction with the accompanying drawings in which:

FIG. 3 is a longitudinal sectional view, taken along line 3—3 of FIG. 1, showing positive releasable locking or latching together of adjacent installed cover panels with consequent controlled compression of a transverse water and dust seal therebetween; also shown in phantom lines is the rearward panel of the pair in a prelatching tilted position prior to installation thereof on the truck;

FIG. 4 is a transverse end view of the rearward end of the forward cover panel of the pair of cover panels shown in FIG. 3, and taken generally along line 4—4 thereof, but with the rearward panel eliminated to enable showing a first or a forward latching member fixed across the rearward end of the forward panel; and FIG. 5 is a transverse end view of the forward end of the rearward cover panel of the pair of cover panels shown in FIG. 3, and taken generally along line 5—5 thereof, but with the forward panel eliminated to enable showing of a second or rearward latching member fixed across the forward end of the rearward panel.

DESCRIPTION OF THE PREFERRED EMBODIMENT

Figure 1:
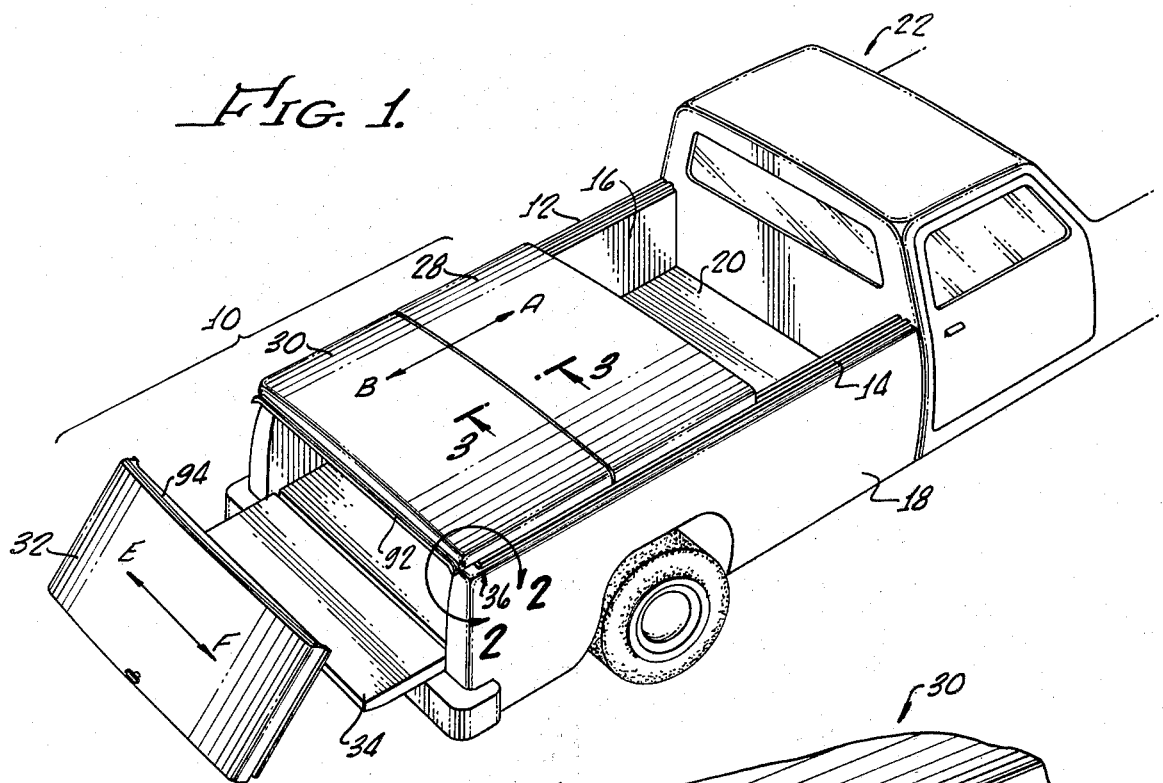
FIG. 1 is a perspective drawing of a conventional pickup truck showing the open bed thereof partially covered by a plurality of cover panels or segments according to the present invention, a rearmost one of the cover panels being shown in a tilted position ready for installation on the truck.

Depicted in FIG. 1 is a cover panel or segment assembly 10, portions of which are shown installed into left and right longitudinal side rails 12 and 14 fixed to corresponding sides 16 and 18 of a bed 20 of an exemplary pick-up truck 22.

Comprising the particular cover panel assembly 10 are first, second and third cover panels or segments 28, 30 and 32, respectively, the first and second panels being shown latched together and installed, as described below, into the side rails 12 and 14 and covering the rearward two thirds of the truck bed 20. Also, as more particularly described below, the third or rearmost panel 32 is shown in a tilted position ready for latching or connecting to the second panel 30. A tailgate 34 of the truck 20 is shown in a lowered or open position as is generally necessary for installing the panels.

It is to be appreciated that although the panel assembly 10 is shown as comprising the three panels 28, 30 and 32, other panel assemblies, according to length of the truck bed 20, may comprise other than the three panels illustrated. While three panels (such as panels 28, 30 and 32) are preferably used in order to facilitate installation and removal of the assembly 10 from the truck bed 20 by a single individual, for short beds 20 or when the bed is effectively shortened, as by installation of a conventional transverse tool box (not shown), only two panels may be required.

Figure 2:
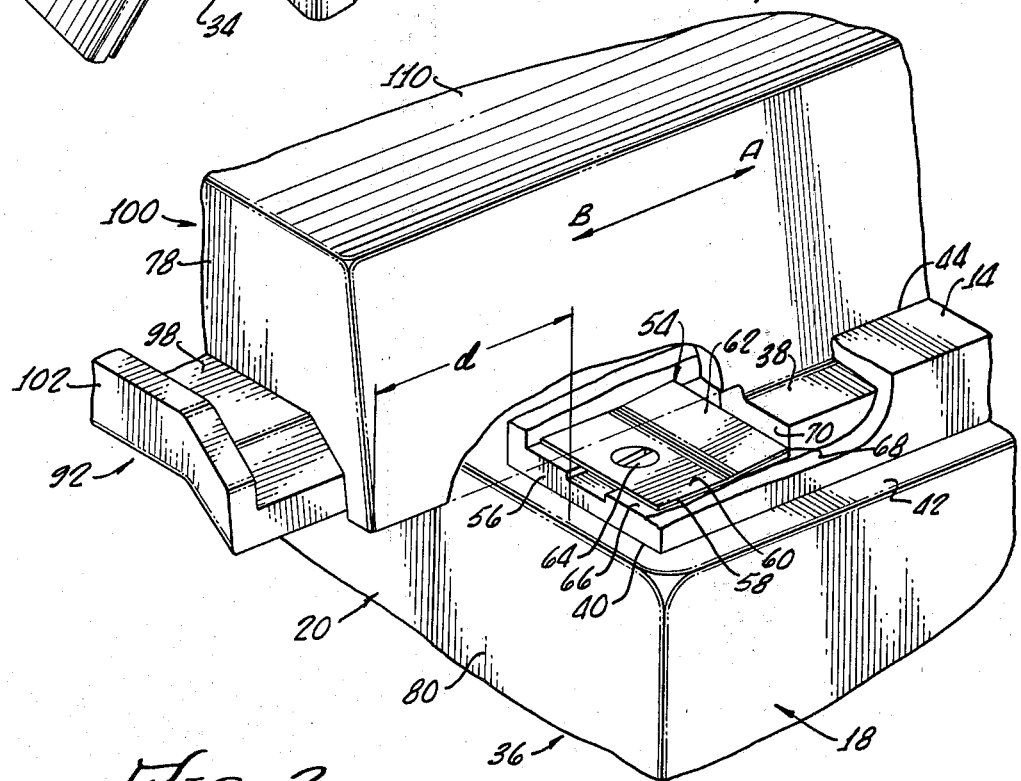
FIG. 2 is a partially cut away perspective drawing showing means for releasably locking each of the cover panels as each panel is installed on the pickup truck, and showing portions of interpanel latching means.

FIG. 2 illustrates a right rear corner region 36 of the truck bed 20 of FIG. 1. A right hand, sidewardly projecting edge or leg 38 of the panel 30 is shown longitudinally, slidingly received into the side channel 14, which is generally "C" shaped in cross section, with a back surface 40 of the "C" lying against an upper surface 42 of the truck bed side 18. When installed in this manner, the channel 14 has a longitudinal slot 44 extending along its uppermost surface, through which the panel leg 38 extends and which permits installed panels to slide longitudinally on and off (direction of arrows A-B) the vehicle, as is necessary to cover and uncover the bed 20. The right hand panel leg 38, as well as a corresponding left hand panel leg (not identified by any reference number) is formed having a slight lengthwise (fore-aft) arch or bow, which, relative to the channels 12 and 14, causes forward and rearward ends of the legs to be urged downwardly in the tracks, while central regions of the legs are at the top of the tracks. Thus, a spring action is provided which not only prevents rattling of the cover panels in the tracks 12 and 14, but which cooperates in disengageably locking the panels into the tracks, as more particularly described below.

Accidental slippage of the panels 28, 30 or 32 from the channels 12 and 14 is prevented, as shown in FIG. 2, by locking means 54 disposed inside the channel 14 adjacent rearward ends 56 thereof. Similar locking means are preferably also provided in the other track 12. As illustrated, the locking means 54 preferably include a metal plate 58 which has a slight transverse bend or "break" in central regions dividing the plate into contiguous rearward and forward transverse portions 60 and 62. A machine screw (or bolt) 64 rigidly mounts the plate rearward portion 60 to an inner, upper surface 66 of the channel 14 such that the forward portion 62 projects forwardly and slightly upwardly.

As shown, upon installation, after the side leg 38 of the panel 30 has slid forwardly over the plate forward portion 62, by upward deflection of the leg, a transverse, vertical, forward face 68 of each plate abuts a transverse rearward surface 70 of the panel leg, which snaps downwardly once past the plate portion 62. A similar locking arrangement is preferably also provided in the track 12. Later, removal of the panel 30 (and similarly the other panels 28 and 32) from the channels 12 and 14 is enabled by lifting rearward ends of the panels until the rearward end of the panel leg 38 is sprung upwardly sufficiently to permit the leg to slide rearwardly over the locking plate 58. In this manner, the panels 28, 30 and 32 can be easily and rapidly unlocked from the tracks 12 and 14 by a single operator.

As typified in FIG. 2, rearward end regions of the panel leg 38 are cut back a short distance along the leg length, for example, several inches, from a rearward panel end 78. As a result, the panel rearward end 78 projects rearwardly a distance 'd', which may be two or three inches, beyond a rearward surface 80 of the truck bed side 18 when the panel 30 (and also similarly for at least the first panel 28) is pulled rearwardly as far as possible without disengaging the locking means 54.

This overhang distance 'd' of the panels 28 and 30 upon removal and, as well, upon installation after panel locking, enables the next rearward panel to be easily unlatched from, or latched to, the forwardly adjacent, installed panel, without danger of panel damage or panel leg breakage.

As best seen in FIGS. 3-5, panel latching or interconnection means 90 associated with each adjacent pair of the cover panels 28, 30 and 32, each comprise a first or forward, transverse member 92 and a second or rearward transverse member 94. Fixed along the second member 94 is an elastometic, transverse panel seal 96. Upon interconnection of each adjacent pair of panels 28, 30 and 32, the associated seal 96 is compressed into water and dirt sealing relationship between the corresponding members 92 and 94 to prevent rain, dirt, etc., from entering the truck bed 20 from between the panels.

The pair of first and second members 92 and 94 forming each of the latching means 90, typified by such means associated with the cover panels 30 and 32 shown in FIGS. 3-5, are complimentarily formed to provide an interconnection hinging action. As such, the first member 92 includes a rearwardly projecting flange or leg 98 which may be formed as part of, or alternatively be connected to, a rear wall 100 of the forward panel of the pair, for example, the panel 30, as shown. Formed at the rearward end of the flange 98 is a short, upwardly projecting flange or leg 102.

Forming the second member 94 is a flange or leg 104 which projects rearwardly from a vertical, forward end wall 106 of the rearmost panel of the adjacent pair, for example, the panel 32 of FIG. 3. The flange 104 may be formed as an extension of the end wall 106 as shown, or be otherwise attached thereto. Length of the second member flange 104 is shorter than the first member flange 98 by an amount sufficient to provide, upon panel interconnection, a preselected minimum compression of the seal 96 assuring good sealing between the pair of adjacent panels. Relative vertical positioning of the flanges 104 and 98 causes, upon panel interconnection, upper surfaces, for example, upper surfaces 110 and 112 of the respective panels 30 and 32, to be in longitudinal alignment, as is necessary for installation on the bed 20.

Configuring the first and second members 92 and 94 in the above described manner also importantly enables the front end of the rear panel of each pair of adjacent panels to be hung onto the rearward end of the corresponding forward panel when the forward panel is installed and locked into the channels 12 and 14, as depicted for the panel 30 in FIG. 2. Thus, for the initial step of panel interconnection, the rearward panel second member flange 104 is disposed in the channel formed by the forward panel flanges 98 and 102 and the rear wall 100, as shown for the phantom-line panel 32 in FIG. 3.

Then the rearward panel 32 is swung upwardly, (direction of Arrow "C") about a pivot line defined generally by the intersection of the first member flanges 98 and 102 and a rearward end 114 of the second member flange 104. As the panel 32 is pivoted into horizontal alignment with the next forward panel 30, the seal 96 is compressed between the adjacent panel end walls 100 and 106. As above noted, the amount of seal compression is preselected when the relative lengths of the first and second member flange 98 and 104 are determined.

For subsequent interpanel unlatching and panel removal from the channels 12 and 14, the rearmost panel 32 is first unlocked by lifting the rearward end of the panel to spring the panel legs up over the locking plate forward portion 62 and pulling the entire interconnected panel assembly 10 rearwardly (direction of Arrow A, FIG. 1) until the locking plate engages the next-to-the-rearmost panel flange surface 70 (FIG. 2). Then the rearmost panel 32 is swung or pivoted downwardly (direction of Arrow "D", FIG. 3) until the panel can be removed or "unhung" from the forwardly adjacent cover panel 30.

When the panel overhang distance 'd' (FIG. 2) is properly selected according to particular rearward configuration of the truck bed 20 or truck 22, for example, by longitudinal position of the locking plate 58 in the channel 14, sufficient clearance is provided to enable pivotally connecting and disconnecting each of the cover panels to and from the next adjacent, installed cover panel without obstruction or panel damage.

Next in sequence, the second panel 30 is similarly unlocked and pulled rearwardly, also thereby pulling the interconnected first panel 28 rearwardly until it reaches the locking/unlocking position. The second panel 30 is then swung downwardly to enable its detachment from the still installed first panel 28, which may then be removed after it is unlocked.

An advantage of this construction is that the entire panel assembly 10 can be slid rearwardly as a unit, in the side channels 12 and 14, a single panel length merely by unlocking the rearmost panel 32 and pulling rearwardly on it. This is convenient when sudden stops of the truck 22 causes tools or equipment carried in the truck bed 20 to slide to the forward end of the bed. Thus, the described interconnection of the three panels 28, 30 and 32 enables quick, convenient access to forward regions of the truck bed 20 without actually having to remove any of the panels.

The panel assembly 10 may be configured so that when the tailgate 34 is closed against the rearmost panel 32 after all three panels 28, 30 and 32 have been installed into the channels 12 and 14, some longitudinal compressional forces on the panels is caused. This assures adequate cover end sealing by end seals (not shown) and also helps prevent rattling of the cover panel assembly. Although such tailgate caused longitudinal compressional forces may increase the compression on one or more of the interpanel seals 96, it is emphasized that the latching means 90 between each adjacent pair of installed panels is configured to provide, in and of themselves, a preselected amount of seal compression which is sufficient to assure good interpanel sealing. That is, at least the minimum seal compression required for good interpanel sealing is provided by the panel latching means 90.

Some problems may occur in obtaining the necessary transverse panel alignment between the panel being connected and the next forward, installed panel. Because the seal 96 is compressed between the panel end walls 100 and 106 when the just connected panel is pivoted into longitudinal alignment with the forwardly adjacent panel, sideward, transverse panel alignment movement (direction of arrows "E" and "F", FIG. 1) thereof, relative to the already installed panel, is difficult. Thus, without good prealignment, disconnection and reconnection of the two panels, possibly several times until the requisite transverse alignment is achieved, might be necessary.

To assure correct transverse panel alignment during panel interconnection, transverse end regions of each pair of first and second latching members 92 and 94 are preferably formed to be generally accurate or beveled in shape with complimentary curvatures or angles as shown for the members 92 and 94 in FIGS. 4 and 5.

Thus, an outer end region 120 of the first latching member 92 on the exemplary panel 30 is curved outwardly and downwardly towards the panel leg 38 and the channel 14 (FIG. 4.) A mating outer end region 122 of the second latching member 14 on the adjacent exemplary panel 32 is similarly curved outwardly and downwardly toward the panel leg 38 and channel 14. Both end regions of both the members 92 and 94 are formed in a similar manner; although, only one end region 120 or 122 is shown for both. As a result, when the rearward panel of an adjacent pair, for example, the panel 32, is hung onto the forwardly adjacent panel, for example, the panel 30, the mating end regions 120 and 122 of the members 92 and 94, respectively, cause transverse centering or alignment of the rearward panel relative to the forward panel. Accordingly, when the rearward panel is swung up to the fully latched position and pushed forwardly to be received into the channels 12 and 14, proper alignment with the channels is assured.

It is further to be appreciated that since the first member 92 extends completely across the end of the associated panels 28, 30 and 32 to which they are fixed, and because of the curvature of the end regions 120 thereof, a channel 124 (FIG. 3) defined by the interconnecting member legs 98 and 102, and by the rear wall 100 extends entirely across each panel intersection. This channel 124, which underlies the corresponding seal 96, functions as a "rain gutter" in case the seal is damaged or if foreign matter, such as twigs or gravel, is inadvertently caught in any seal area during panel installation. Any consequent water leakage past the seal 96 flows along the channel 124 to the insides of the side channels 12 and/or 14 and out forward or rearward ends thereof.

This function of water channeling by the channel 124 in case of interpanel seal failure is an important advantage achieved by forming at least the first latching member 92 to extend continuously across the corresponding end of the associated cover panel 28, 30 or 32, rather than making it only sufficiently wide to enable adequate interpanel latching.

It is also further emphasized that the panel locking means 54 serves not only the important function of releasably retaining the installed panels 28, 30 and 32 in the channels 12 and 14, but also serves an important additional function of assuring proper positioning of an installed panel relative to a rearward panel slid from the channels 12 and 14 to enable unlatching of the panels without damage to the panel being removed.

Together the latching means 90 and locking means 54 greatly improve the installability and removability of the panel assembly 10 by a single individual, as is considered important. Reliability of interpanel sealing is also greatly improved by the described interpanel latching configuration.

Although there has been described above a specific arrangement of panel latching and locking apparatus for modular truck bed cover systems in accordance with the invention for purposes of illustrating the manner in which the invention may be used to advantage it will be appreciated that the invention is not limited thereto. Accordingly, any and all modifications, variations or equivalent arrangements which may occur to those skilled in the art should be considered to be within the scope of the invention as defined in the amended claims.

What is claimed is:

1. In a modular cover system for the bed of a pickup truck or the like, in which the cover system includes a plurality of transverse panels having a width spanning said bed and a pair of longitudinal panel mounting members, one member being mounted along each side of said bed in panel side edge retaining relationship, the panels including compressable transverse panel seals between each adjacent pair of panels when the panels are received by the panel mounting members in a predetermined arrangement to cover the bed, panel interconnecting and locking apparatus which comprises:

latching means for releasably latching together each adjacent pair of panels as said panels are being installed in said mounting members and for assuring a predetermined minimum compression of said panel seals therebetween, said latching means including a rigid first latch member fixed to a transverse end of a first one of each said adjacent pair of received panels and a rigid second latch member fixed to an adjacent transverse end of a second one of each of said adjacent pair of received panels, said first and second latch members being engageable and disengageable, as the panels are received by, and removed from, said mounting members by pivoting a rearward panel of each of said adjacent pairs of panels relative to a forward panel thereof, said predetermined minimum seal compression being caused when said rearward panel is pivoted into a longitudinally aligned relationship with said forward panel.

2. The panel interconnecting and locking apparatus according to claim 1, including locking means for releasably locking each panel relative to at least one of said longitudinal members as each panel is fully received thereby and for preventing removal therefrom until said locking means is released.

3. The panel interconnecting and locking apparatus according to claim 2, wherein the locking means includes a locking element fixed near a rearward end of at least one of said longitudinal members in a position enabling an unlocked, rearward one of each adjacent pair of installed panels to be removed from the longitudinal members and to be pivotally unlatched from the corresponding forward panel while said forward panel remains locked relative to the longitudinal members, said locking means thereby also enabling a determination to be made of when any just removed rearward panel can be pivoted relatively to the forwardly adjacent panel for unlatching and separation therefrom without panel damage.

4. In a modular cover system for a bed of a pick-up truck or the like, in which the cover system includes a plurality of transverse panels having a width spanning said bed and a longitudinal panel mounting member mounted along each opposite side of said bed in panel side edge retaining relationship, the panels including transverse panel seals between each adjacent pair of panels when the panels are received by the longitudinal members in a predetermined arrangement to cover the beds, panel interconnecting and locking apparatus, which comprises:

(a) latching means for releasably latching, when the panels are received by the longitudinal members, each panel to a forwardly adjacent panel, said latching means including interlocking first and second latch members fixed respectively to adjacent transverse ends of forward and rearward panels of each adjacent pair of received panels, said first and second latch members causing, when the rearward panel of each adjacent pair is pivoted into a latched relationship, a preselected minimum compression of said seals, thereby insuring panel-to-panel sealing therebetween upon installation; and (b) locking means for releasably locking each panel relative to the longitudinal members, as it is received thereinto, said locking means enabling rearward release of any panel from the longitudinal members without unlocking more forward panels therefrom.

5. The panel interconnecting and locking apparatus according to claims 1 or 4, wherein the panel latching means includes means causing transverse alignment of adjacent panels during latching therebetween, receiving of the rearward panel of each adjacent pair of panels into the longitudinal members being thereby readily enabled.

6. The panel interconnecting and locking apparatus according to claims 1 or 4 in which the panel system includes a forward panel, at least one intermediate panel and a rearward panel and wherein the first latch members are channel shaped and are fixed to rearward end surfaces of the forward and intermediate panels and the second latch members are angle shaped and are fixed to forward end surfaces of the intermediate and rearward panels, said angle shaped member fitting downwardly into said channel shaped member for panel latching.

7. The panel interconnecting and locking apparatus according to claim 6, wherein each first latch member includes a rearwardly extending portion having an upwardly extending leg formed at a rearward end thereof, and wherein each second latch member includes a first downwardly extending portion having a rearwardly extending leg formed at a lower end thereof, a rearward end of said second member rearwardly extending leg fitting downwardly into and pivoting about a region of the first member defined by the intersection of the horizontal portion and vertical leg thereof upon latching engagement between forward and rearward panels of each adjacent pair of received panels.

8. The panel interconnecting and locking apparatus according to claim 6, wherein said channel shaped member is disposed below the corresponding interpanel seal and extends between opposite side edges of the panels, the channel thereby functioning as a rain gutter in the event the seal is damaged or foreign objects in seal regions prevent adequate sealing.

9. The panel interconnecting and locking apparatus according to claims 2 or 4, wherein the locking means includes a locking element fixed at a rearward end of at least one of the panel mounting members and includes forming member engaging side edges of the panels in a slight fore-aft arch such that forward ends of the panel edges deflect upwardly to ride over the locking element upon panel installation and so that rearward ends of the panel edges can be sprung upwardly over the locking element for panel removal.

* * * * *